Oct. 9, 1945.  O. F. JENSEN  2,386,318
ROTARY STEAM ENGINE
Filed Sept. 25, 1942  2 Sheets-Sheet 1

INVENTOR.
OLUF F. JENSEN
BY Corey & Fletcher
ATTORNEYS

Oct. 9, 1945.        O. F. JENSEN        2,386,318
ROTARY STEAM ENGINE
Filed Sept. 25, 1942        2 Sheets-Sheet 2

INVENTOR.
OLUF F. JENSEN
BY Corey & Fletcher
ATTORNEYS

Patented Oct. 9, 1945

2,386,318

UNITED STATES PATENT OFFICE 2,386,318

ROTARY STEAM ENGINE

Oluf F. Jensen, Council Bluffs, Iowa

Application September 25, 1942, Serial No. 459,703

3 Claims. (Cl. 121—70).

This invention relates to a steam engine, more particularly a rotary steam engine using vaned rotors and a rotating valve adapted to critical adjustment in order to obtain flexible operation of an essentially high speed engine.

The principal object of my invention is to provide a high speed rotary steam engine which is flexible in operation and efficient in the use of steam pressure.

Another object of my invention is to provide a rotary steam engine in which the rotors thereof will at all times maintain a tight sealed relationship between each other.

A still further object of my invention is to provide a rotary steam engine having an admission valve, simple and durable in construction, which will accurately and positively admit steam to the engine at the same point during each revolution.

A still further object of my invention is to provide a rotary steam engine having a valve which will accurately time the duration of the admission of steam.

A still further object of my invention is to provide a rotary steam engine having a valve which may be quickly adjusted to increase and decrease the pressure to which the engine is subjected.

Other and further features and objects of my invention will be more apparent to those skilled in the art upon consideration of the accompanying drawings and following specifications, wherein is disclosed a single exemplary embodiment of the invention, with the understanding, however, that such changes may be made therein as fall within the scope of the appended claims, without departing from the spirit of the invention.

Heretofore it has been the custom in steam engines to employ a reciprocating piston and to convert the reciprocating motion into rotary movement through driving rods and the like. In such an engine the course of travel of the piston must be changed at the end of each stroke and thus a considerable amount of the steam pressure is utilized in overcoming the dead weight of the piston to alter its direction of travel. For this reason the efficiency of such an engine, in relation to the amount of steam required for its operation, is low and the engine must run at a relatively low rate of speed.

My engine is completely rotary in movement and does not at any point duplicate the dead-center position of the conventional reciprocating engine. The rotors move only in one direction and thus the power impulse of each steam admission is carried forward to the next cycle and thus greater efficiency in the utilization of steam is obtained. For this reason my engine is also capable of substantially high speed operation, much higher than that of the conventional reciprocating engine. Furthermore, since the movement is entirely rotary, the motion may be conveyed, without much loss of power, to rotary mechanisms such as boat propellers, electrical generators and the like.

Other rotary steam engines have been devised but they have failed in operation because they have attempted to utilize valve structures which are adaptable to the usual low speed reciprocating steam engine and therefore are not particularly sensitive or flexible. It is apparent that the power impulses in a rotary engine are cumulative. Thus a valve capable of close regulation is necessary. I have provided such a valve.

I have provided a rotary steam engine which overcomes the disadvantages heretofore related, as will be appreciated and as will hereinafter be more fully set forth.

Figure 1:
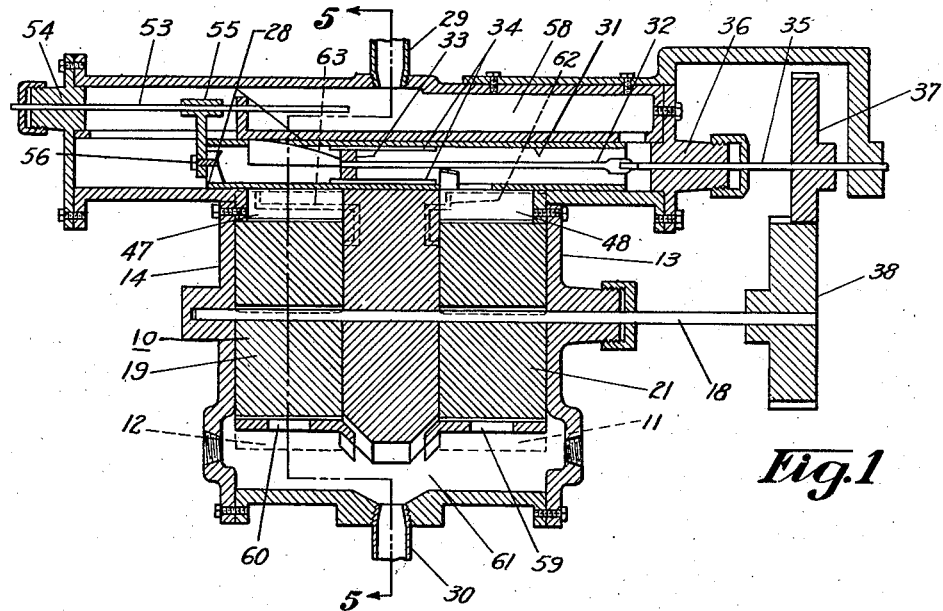
Figure 1 is a cross-sectional view taken through the center of my engine.
Figure 2:
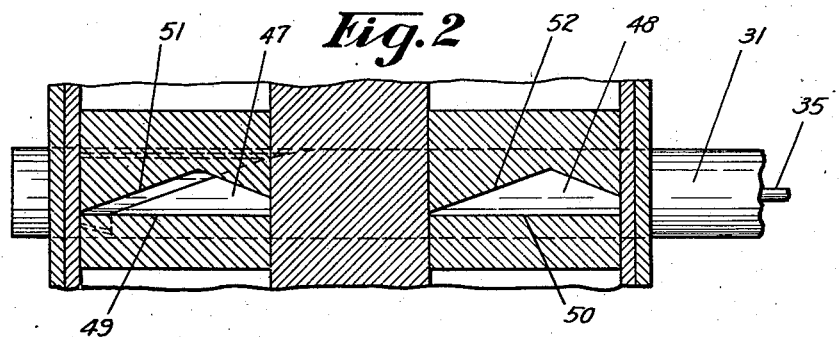
Figure 2 is a bottom sectional view of a portion of my engine showing the valve openings and the valve ports.
Figure 5:
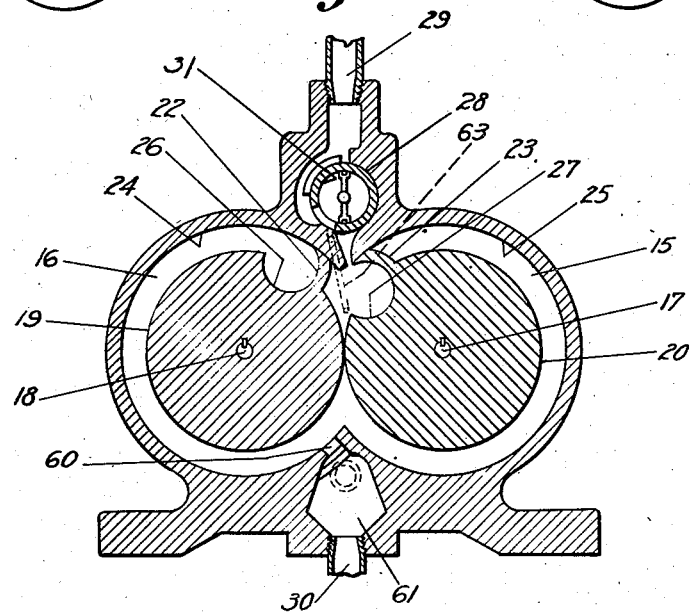
Figure 5 is a cross-sectional end view of my engine taken on line 5—5 of Figure 1.
Figure 6:
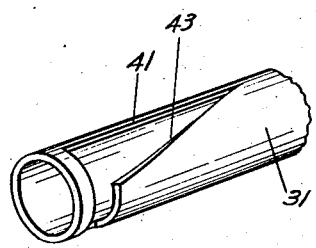
Figure 6 is a perspective view of a portion of the valve sleeve to more fully illustrate the nature of the valve opening.

Referring now to the drawings, more particularly to Figure 1, I have used the numeral 10 to indicate the main portion of my engine; a spacer plate having integrally formed therewith two housings 11 and 12 enclosed with face plates 13 and 14. Each housing consists of two overlapping cylinders 15 and 16 as shown in Fig. 5. Extending through the housing and journaled in the face plates are shafts 17 and 18. Mounted on the shafts within the cylinders of one housing are rotors 19 and 20 as shown in Fig. 5. A similar set of rotors are mounted in the other housing, one of which is indicated at 21 of Fig. 1. Secured to these rotors are vanes 22 and 23. The peripheries of the rotors 19 and 20 are in rolling contact with each other. The outer edges of these vanes are in contact with the cylinder walls 24 and 25 and each rotor is provided with circular recesses 26 and 27 at the base of its respective vane. The recesses are so positioned that when the rotor is revolved they become complementary to the vane of the opposite rotor, so that the vane of one rotor will intermesh with the recess of the other as the two of them revolve, thus maintaining a tight seal at all times between the two rotors, and allowing passage of the vanes.

Positioned above and between the two housings is a valve casing indicated generally at 28 as shown in Figs. 1 and 5. Directly above this valve chamber is a steam chamber 58 and inlet conduit 29. An exhaust opening 30 is provided at the lower portion of my engine.

Referring again to the drawings, particularly Figures 1 to 4, I will now describe more particularly the nature of the valve employed in my steam engine. As heretofore mentioned, a circular casing 28 is provided. Within this casing is a cylindrical valve sleeve 31 mounted for both rotary and longitudinal movement. To provide this rotary movement a shaft 32 is slidably mounted within the valve casing by means of an I-bar 33 and slide members 34, on the valve. Attached to the outer end of the rod 32 by means of a universal joint is a shaft 35 which extends through the bearing 36 at the end of the valve chamber and has journaled thereon gear wheel 37. The gear wheel is adapted to cooperate with the gear wheels mounted upon the shafts 17 and 18, one of which is shown at 38. Through this gearing, the rotation of the valve is fixed, and timed in relation to the movement of the rotors.

Figure 10:
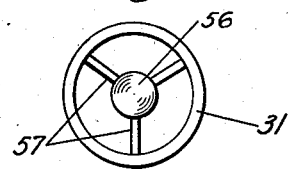
Figure 10 is an end view of the valve to further illustrate the means of attaching the longitudinal control rod to the valve sleeve.

The longitudinal movement of the valve sleeve is obtained through movement of a rod or shaft 53 which extends through a packing gland 54, disposed at one end of the valve casing member, and is actuated by a lever or other conventional means (not shown). Mounted on this shaft is an arm 55 which extends downwardly to the end of the valve sleeve 31 and is connected thereto by means of a bolt 56 or the like and radiating vanes 57 as shown in more detail in Figure 10. The bolt rotates in the arm 55 as the sleeve 31 rotates. This construction has been provided in order to keep the ends of the valve sleeve open to receive steam which enters the engine by means of the conduit 29 through the steam chamber 58.

Figure 3:
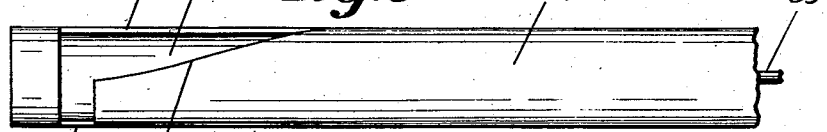
Figure 3 is a plan view of the valve sleeve used in my engine.
Figure 4:
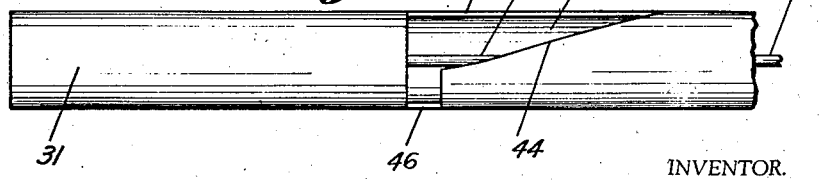
Figure 4 is another plan view of the valve sleeve used in my rotary engine, more fully illustrating its structure.
Figure 9:
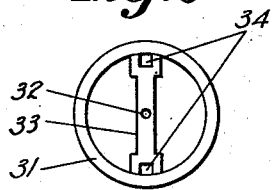
Figure 9 is an end view of my valve to illustrate the slide means used to impart rotary motion to the valve.

The valve 31 is provided with two openings 39 and 40 as shown in Figures 3 and 4. These openings are disposed in a diametrically opposite and longitudinally spaced relation to each other, each extending through one-half of the circumference of the valve sleeve, and each being substantially above one set of rotors. The forward edge of the opening, in relation to the direction of rotation of the valve, is parallel to the valve sleeve as indicated at 41 and 42. The trailing edges 43 and 44 are tapered angularly or diagonally in relation to the forward edges and extend through slightly more than one-quarter of the circumference of the valve sleeve to a point spaced somewhat distant from the radial edge of the valve openings. The edge of the opening then extends radially around the valve sleeve to similarly angular edges 45 or 46 which are positioned at approximately one-half the distance around the sleeve in relation to the forward edge of the opening, providing in all a valve opening of about 180 degrees.

Figure 7:
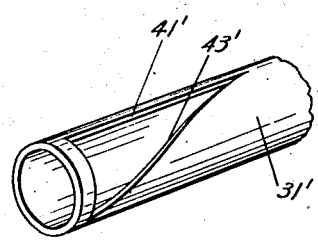
Figure 7 is a perspective view of a valve sleeve illustrating a modified form of valve opening.
Figure 8:
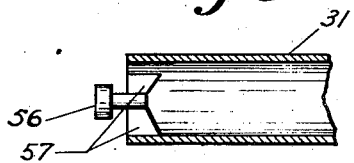
Figure 8 is a cross-sectional side elevation of the end portion of the valve sleeve to more fully illustrate the means for attaching the longitudinal control rod to the valve.

A modified form of this valve sleeve opening is shown in Figure 7. In this instance the angular side of the opening is extended throughout approximately 180 degrees as indicated at 43'.

Formed within the housing and extending into the valve casing 28, midway between the rotors, are two substantially triangular ports 47 and 48. One edge of each of these ports is parallel to the valve casing as indicated at 49 and 50 to correspond with the parallel edge of the valve sleeve opening. One angular edge in each port extends a little more than one-half the length of the port.

I have further provided channels 62 and 63 which extend from the inside of the valve casing slightly in advance of the valve port opening to a point substantially half-way between the rotors 19 and 20, all as substantially shown in Figures 1 and 5. The intention of these channels is to provide for a preliminary admission of steam between the two rotors and their respective vanes in order that the rotors may be under pressure when the primary valve opening takes place.

From this description it will be apparent that steam entering through the conduit will pass into the ends of the valve sleeve 31 then through the valve openings 39 and 40 whenever they coincide with the valve casing ports 47 and 48. The steam pressure will then serve to rotate the rotors 19 and 21 as shown in Figure 1 by means of the vanes shown in Figure 5. As the vanes of the rotors reach the bottom of the cylinders the steam will be allowed to escape through the exhaust ports 59 and 60, thence into the exhaust chamber 61 and out through the conduit 30.

By means of the longitudinal movement of the valve sleeve the amount of steam introduced into the cylinders may be closely regulated. The forward edge of the valve sleeve opening being parallel to the forward edge of the port opening the two openings will always coincide with each other at the same time in the cycle, thus admitting steam to the cylinders only when the rotors are in a certain predetermined position. By sliding the valve longitudinally of the valve casing the trailing edge of the valve opening will meet the rearward edge of the port opening at different times. In this manner the area permitted for the admission of steam is considerably reduced as the valve is moved to one side, thus limiting the time in which the rotors are subjected to steam admission.

The valve openings each extend through approximately 180 degrees of the valve sleeve. Thus, should the engine be stopped when the valve openings are in a closed position in relation to the valve ports, the valve sleeve may be moved longitudinally of the valve casing, bringing a portion of one of the valve openings into line with its corresponding valve port.

It is further apparent that my valve sleeve depends for support directly on the valve casing and is not journaled in bearings of any kind. This structure may be termed a "floating valve" and as such will always maintain a tight relationship with the valve casing.

Thus it will be seen that I have provided a steam engine which combines a positively and accurately proportioning steam valve with a vaned rotary-type motor in such a manner that increased power output may be obtained and efficiently regulated and which fulfills all the objects of my invention. The engine will start under full load and run at high speed, is flexible in operation and makes efficient use of steam pressure.

Some changes may be made in the construction and arrangement of my improved steam engine without departing from the real spirit and purpose of my invention and it is my intention to cover by my claims any modified forms of structure within their scope.

I claim:

1. In a rotary steam engine, a housing having overlapping cylinders therein and rotors disposed within the cylinders, a valve casing positioned above the rotors, a valve sleeve rotatably and longitudinally slidably positioned in said casing, a pair of valve ports within the valve casing, one edge of said ports being parallel in relation to said casing, a pair of openings within the valve sleeve, one edge of said opening being parallel to the said sleeve, small openings within the valve casing adjacent to the parallel edges of the valve ports, conduits extending from said opening to a position within the cylinders adjacent to the rotors, the valve sleeve being so positioned that the parallel edges of the openings therein will permit steam to enter through the aforementioned conduits before permitting it to enter through the valve ports when the said valve is rotated.

2. In a device of the class described, a housing having a pair of overlapping cylinders therein, a pair of complementary rotors having intermeshing vanes mounted thereon, said rotors disposed within the cylinders, a tubular valve casing having a single triangular port therein extending into one of the cylinders, and a valve sleeve mounted within the valve casing and having a triangular port therein, and means for causing said valve sleeve to move relative to said valve casing, one edge of each of said triangular ports being disposed in an axial direction, generally perpendicular to the direction of relative movement between said valve sleeve and valve casing, and the opposite edge of both the casing port and the sleeve port making an acute angle with respect to said one edge associated therewith, said ports being arranged so that they come into communication by passage of one axial edge over the other and communication therebetween is terminated by one angled edge passing over the other angled edge, said acute angles being equal so that said angled edges are parallel when in registration, each port extending for substantially the major portion of the axial length of said rotors, whereby a single steam inlet substantially the shape of a parallelogram the major axis of which extends generally axially of said housing will be presented when the valve sleeve is rotated within the casing, and means for moving the valve sleeve longitudinally of the valve casing to vary the total area of the aforementioned parallelogram.

3. In a device of the class described, a floating sleeve valve, for use with a rotary steam engine, comprised of a valve casing having steam inlet and outlet ports, said outlet ports having one marginal edge parallel in relation to the casing, and a second marginal edge of uniform diagonal taper making an acute angle with said marginal edge and extending to a point slightly more than one-half the length of said port, a valve sleeve mounted in and supported substantially wholly by said casing for both rotary and longitudinal movement, said sleeve having enlarged openings therein, one marginal edge thereof being parallel to the sleeve and a second marginal edge being diagonally tapered to the same degree as that of the diagonal edge of the aforesaid outlet port and having a perpendicular continuation of said second marginal edge to increase the width of said valve opening at one end thereof, and means flexibly connected with said sleeve valve for rotating the latter.

OLUF F. JENSEN.